(No Model.)
J. C. STURGEON.
PIPE OR HOSE COUPLING.
No. 409,123. Patented Aug. 13, 1889.
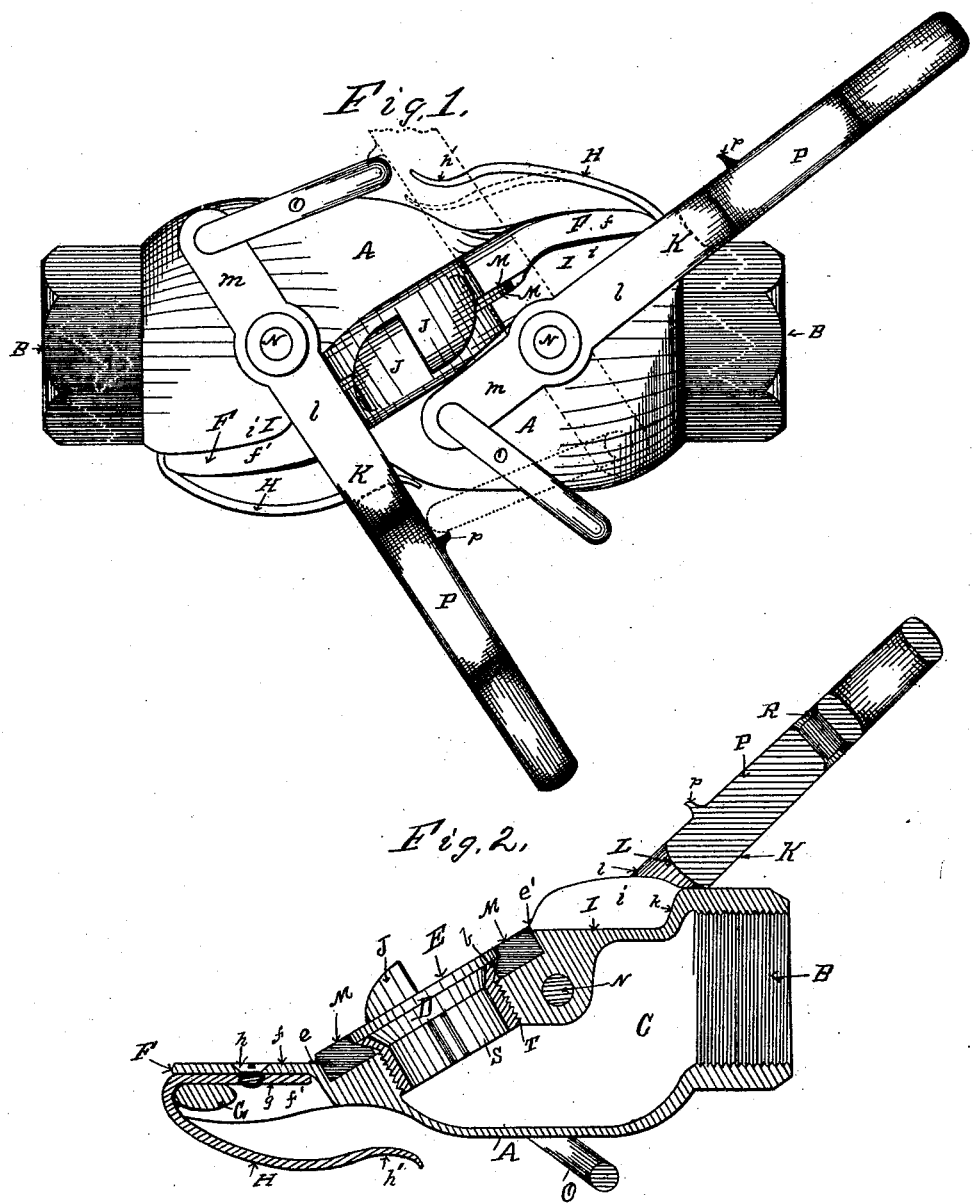
Witnesses.
G. J. Mead,
F. J. Barrett
Inventor
John C. Sturgeon

UNITED STATES PATENT OFFICE.

JOHN C. STURGEON, OF ERIE, PENNSYLVANIA, ASSIGNOR OF ONE-FOURTH TO SAMUEL A. DAVENPORT, OF SAME PLACE.

PIPE OR HOSE COUPLING.

SPECIFICATION forming part of Letters Patent No. 409,123, dated August 13, 1889.

Application filed August 4, 1888. Serial No. 282,004. (No model.)

*To all whom it may concern:*

Be it known that I, JOHN C. STURGEON, a citizen of the United States, residing at Erie, in the county of Erie and State of Pennsylvania, have invented certain new and useful Improvements in Pipe or Hose Couplings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in pipe or hose couplings hereinafter set forth and explained, and illustrated in the accompanying drawings, in which—

Figure 1 is a plan view of my improved coupling. Fig. 2 is a longitudinal section of one of the halves or sections of the same.

Like letters refer to like parts in both of the figures.

This invention is designed as an improvement on my prior inventions in pipe-couplings, filed January 3, 1888, Serial No. 259,741, and April 16, 1888, Serial No. 270,857, some of the features of this invention being shown, described, and claimed in said cases.

Therefore the principal objects of this invention are to construct a coupling for coupling steam pipes or hose between railway-cars of duplicate halves or sections having diagonal coupling-faces, and lever and spring mechanism for locking them together, adapted to compress the packing-faces together and automatically take up the wear and prevent leakage, and which at the same time is adapted to be quickly coupled and uncoupled when desired.

Other features of my invention appear hereinafter in the specification and claims.

In the construction of my improved coupling shown, A A are duplicate halves or sections of the coupling, each having a screw-collar B, suitable for securing the same to a pipe or nipple, and a steam-passage C therefrom to an opening at D through a diagonal coupling-face E. The plane of the coupling-face E is made diagonal to a line drawn longitudinally through the coupling, by means whereof I am enabled to considerably reduce the size of the coupling both in length and width, and also I am enabled to utilize simple and effective locking-up mechanism, which is not practicable with a longitudinal coupling-face. The coupling-face E is chambered out around the opening D therein, so as to receive a packing-ring M, which packing-ring is preferably secured in place by a thimble S, having a peripheral flange $b$ on its upper end engaging with a flange on the inside of the packing-ring M and a screw-thread T on its lower end fitting into a like screw-thread in the opening D. On the outer edge $e$ of the coupling-face E, I make a longitudinal projection F, having a bottom $f$ and sides $f'$, and near the outer end thereof, between the sides $f'$, I secure a cross-bar G, preferably cast integral therewith, so that the end $g$ of a spring H can be placed between the bar G and bottom $f$ and secured in place therein by a screw $h$, so that the spring H can be quickly removed and replaced by another, if desired. At the opposite or inner edge $e'$ of the coupling-face E, I make a longitudinal pocket I, having sides $i$ and adapted to receive the projection F of a duplicate half or section of the coupling and prevent any lateral movement thereof when in place therein.

On the front or outer portion of the periphery of the coupling-face E, I make laterally-projecting lugs J, so that when two halves or sections of the coupling are placed together, as illustrated in Fig. 1, the lugs J of each half or section interlock with each other, so as to prevent the sections from being drawn apart longitudinally. To each of the halves or sections A in the rear of the inner edge $e'$ of the coupling-face E at N, I pivot a forked lever K, adapted to embrace the sides of the coupling-section and to be moved around from the rear end $k$ of the pocket I to a position at right angles with the plane of the diagonal coupling-face E, so that when the projection F of one section occupies the pocket I of the other section the bearing L on the lever K will travel up and depress the cam-shaped spring H until it rests in the depression $h'$ therein, at which point the strain on the lever K is substantially at right angles with the plane of the coupling-face E, so that when the lever K on each half or section of the coupling is in that position the packing-rings M in the coupling-faces E are firmly compressed together, the elasticity of the springs H also operating to automatically take up all wear and lost motion of the parts, so as to at all times insure the perfect contact of the faces of the packing-rings M.

To the arms *l* of the levers K beyond the pivot N, I secure extensions *m* on each side of the coupling-body A, and in the ends of these extensions *m*, I pivot a link O, adapted to extend from the ends of the levers *m* to and engage with the handles P of the levers K when the coupling-sections A A are locked together, as illustrated in Fig. 1. Lugs *p* are also made on the lever-handles P to prevent the ends of the links O slipping thereon, so that the operator can throw both of the levers back simultaneously, thereby unlocking the coupling.

Having thus fully described my invention, so as to enable others to make and use the same, what I claim as new, and desire to secure by Letters Patent of the United States, is—

1. The combination, in each half or section of a pipe or hose coupling composed of duplicate halves or sections, of a shell having a diagonal coupling-face and laterally-projecting flanges on the periphery of the outer end or portion of said coupling-face adapted to engage with like flanges on a duplicate half or section of the coupling and prevent them from being drawn apart longitudinally, with lever mechanism on each half adapted to be moved around so as to engage with a projection on a duplicate half or section of the coupling for securing such halves or sections of the coupling together, substantially as and for the purpose set forth.

2. The combination, in each half or section of a pipe or hose coupling composed of duplicate halves or sections, of a lever pivoted to such half or section at one side of the coupling-face, with a curved leaf-spring secured to a projection of such half or section at the opposite side of the coupling-face within the path of the lever pivoted to a duplicate half or section when the two halves or sections of the coupling are brought together, so that the lever on each half or section may be moved around so as to engage with the spring on the duplicate half or section of the coupling, substantially as and for the purpose set forth.

3. The combination, in each half or section of a pipe or hose coupling composed of duplicate halves or sections, of a shell having diagonal coupling-face and a projection at one side of the coupling-face and a spring mounted therein, with a pocket at the opposite side of the coupling-face adapted to receive the projection on a duplicate half or section of the coupling, and a lever pivoted to such half or section adapted to be moved around so as to engage with the spring on a duplicate half or section of the coupling when two such halves or sections of the coupling are placed together, substantially as and for the purpose set forth.

4. The combination, in a pipe-coupling composed of duplicate halves or sections, of a locking-lever on each half or section adapted to be moved around so as to engage with a duplicate half or section when two halves or sections are coupled together, with a link pivoted to the locking-lever on each half or section and adapted to be moved around into contact with the locking-lever of a duplicate half or section when the two halves or sections of a coupling are locked together, substantially as and for the purpose set forth.

5. The combination, in each half or section of a pipe or hose coupling composed of duplicate halves or sections, of a hollow shell A, having a diagonal coupling-face E and laterally-projecting flanges J thereon and a longitudinal projection F at one side of the coupling-face E and a pocket I at the other, with a spring H, mounted in said projection F, and a forked lever K, mounted in the shell A below the pocket I and adapted to be moved around so as to engage with a spring H on a duplicate half or section of the coupling when two sections of the coupling are placed together, substantially as and for the purpose set forth.

In testimony whereof I affix my signature in presence of two witnesses.

JOHN C. STURGEON.

Witnesses:
  H. M. STURGEON,
  F. J. BASSETT.